June 9, 1964   L. P. CURTIN   3,136,576
EASILY ACCESSIBLE VEHICLES
Filed April 24, 1962   2 Sheets-Sheet 2
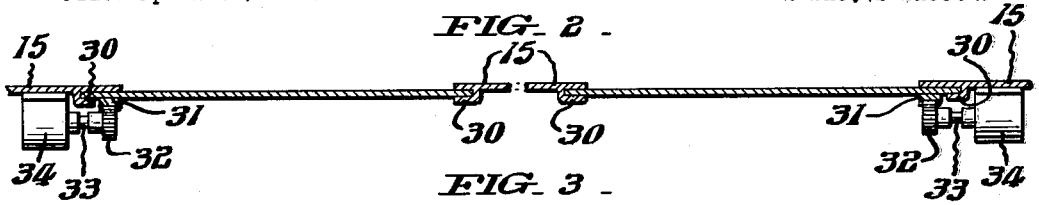
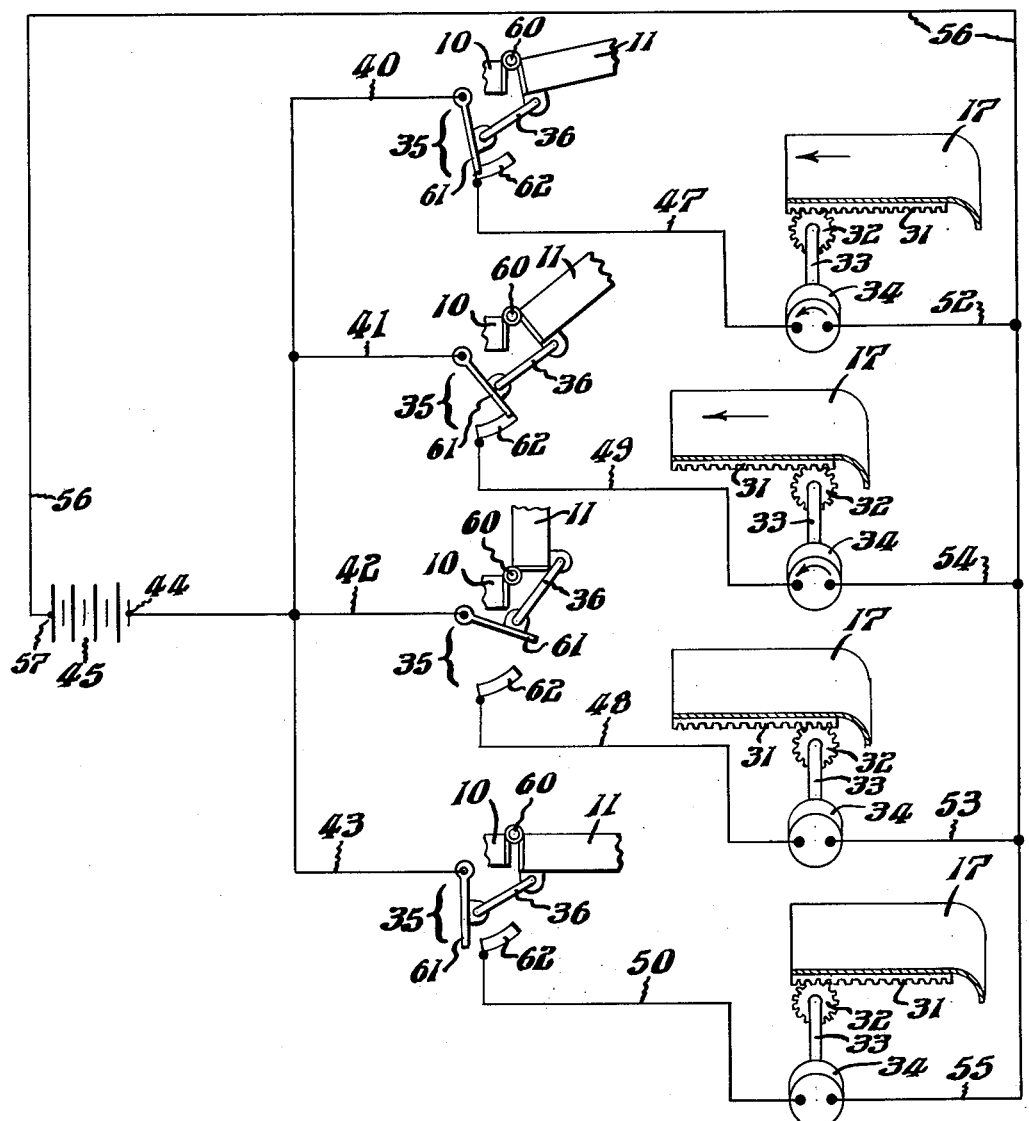
INVENTOR.
Leo P. Curtin,
BY
Paul & Paul
ATTORNEYS.

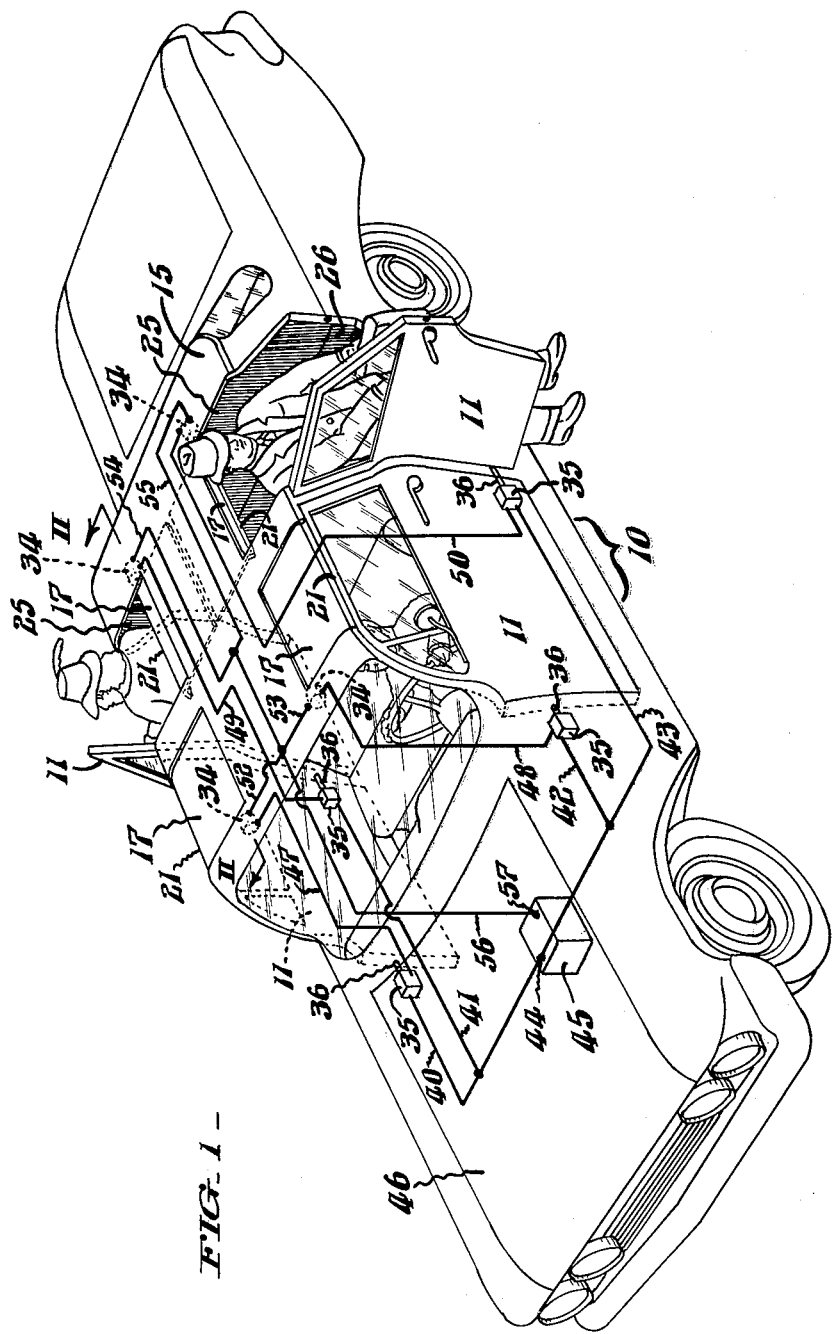

United States Patent Office 3,136,576
Patented June 9, 1964

3,136,576
EASILY ACCESSIBLE VEHICLES
Leo P. Curtin, 107 N. Main St., Cranbury, N.J.; Leo V. Curtin, executor of said Leo P. Curtin, deceased
Filed Apr. 24, 1962, Ser. No. 189,902
2 Claims. (Cl. 296—44)

This invention relates to movable closures for vehicles. More particularly, this invention relates to retractable roof panels contiguous with the side door openings in automobile bodies, motor truck bodies, roofed motor boats and other similar vehicles.

It is an object of this invention to provide movable closure means for a roofed vehicle which is normally cooperative with the side door thereof and effectively enlarges the side door opening to permit easy and relatively comfortable passage therethrough.

It is another object of this invention to provide movable closure means for a roofed vehicle which may be moved either manually or by power operated means, such as an electrical, hydraulic or pneumatic drive or the like.

It is another object of this invention to provide a retractable panel contiguous with the side door opening of a roofed vehicle, such as an automobile or the like, which substantially enlarges the side door opening of the vehicle, yet which is displaced by movement substantially in the plane of the roof of the vehicle, thereby avoiding any undesirable increase in the wind resistance caused by the projection of the panel from the body of the vehicle.

Other objects and attendant advantages of the invention will become more fully apparent hereinafter and in the drawings wherein:

FIG. 1 is a view in perspective of an automobile embodying a plurality of retractable panels, as provided in accordance with this invention;

FIG. 2 is a sectional view taken as indicated by the lines and arrows II, II in FIG. 1, and FIG. 3 is a diagrammatic representation of various stages in the operation of drive elements for the retractable panels, as provided in accordance with this invention.

The following description is directed to the specific form of the invention illustrated in the drawings and is not intended to be addressed to the scope of the invention itself which may be practiced in a wide variety of forms and arrangements.

In FIG. 1 is shown an automobile having a body 10 provided with doors 11 adjacent which are also provided in the roof 15 of the automobile retractable panels 17 on both the left and right hand sides of the body 10. The panels 17 have end or exterior edges 21 which, it will be seen from the position of the forward or front panels 17 in FIG. 1, are contiguous with the top edges respectively of the doors 11 when the aforesaid panels and doors are in the closed position. From the position of the rearward panels 17 in FIG. 1, it will be seen that the panels when retracted provide openings 25 which are contiguous with the side door openings 26 provided by the opening of the side doors of the car.

As may be seen in FIG. 2, the panels 17 are supported in grooves formed by L-shaped members 30 provided for that purpose on the undersurface of the roof 15. Secured to the undersurface of the panels 17 are toothed racks 31 which are adapted to engage pinions 32 mounted to the shafts 33 of reversible motors 34. In FIG. 1 it may be seen that the motors 34 are four in number and positioned immediately beneath the roof 15 adjacent each of the panels 17.

Adjacent the hinged side of each of the doors 11 are mounted switches 35, having connecting links 36, secured to the end of each door, and which operate in a manner and for a purpose to be explained more fully hereinafter.

The switches 35 are connected through lead wires 40, 41, 42 and 43 to a terminal 44 of an automobile battery 45 positioned as usual beneath the hood 46 of the car. Lead wires 47, 48, 49 and 50 connect the motors 34 with the switches 35, and lead wires 52, 53, 54, 55 and 56 connect motors 34 to a terminal 57 of the battery 45.

In FIG. 3, the doors 11 are shown hung to the body 10 of the automobile on hinges 60 and connected to the switches 35 through the links 36. The contact switches comprise wiper or contact arms 61 and contact plates 62.

Operation

In the normal operation of the movable closure as provided in accordance with this invention, the retractable panels 17, open and close concurrently with the doors 11. Normally when a door 11 is completely closed as shown in the last stage of the four stages of operation illustrated diagrammatically in FIG. 3, the panel 17 adjacent thereto is also fully closed, the motor 34 associated therewith is off, and contact is broken between the wiper arm 61 and the contact plate 62 of the switch 35 connected to the aforesaid door. With the door 11 and the panel 17 closed, the wiper arm 61 is displaced from the contact plate 62 by an arc of approximately 10°.

The first stage of operation diagrammatically illustrated in FIG. 3, shows door 11 open through an arc of approximately 10°, in which position wiper arm 61 makes initial contact with contact plate 62, thereby completing the circuit between leads 40 and 47 and starting the motor 34. As the motor 34 rotates in a counterclockwise direction the torque is communicated through the shaft 33 to the pinion 32, which likewise rotates in a counterclockwise direction, thereby starting the backward movement of panel 17 by reason of the engagement of the pinion 32 with the toothed rack 31 attached to the aforesaid panel.

In the second stage of operation diagrammatically illustrated in FIG. 3, the door 11 is open through 40° of arc, and the wiper arm 61 of the switch 35, has passed through 30° of arc over the contact plate 62 to the opposite edge thereof, having been pulled into that position by means of the linkage 36 between the door 11 and the wiper arm 61 of the switch 35. The circuit between leads 41 and 49 is still closed and the motor 34 is still running in a counterclockwise direction but the panel 17 has been retracted fully inwardly as may be seen by the relative position of the pinion 32 and the toothed rack 31 in the second stage of the diagrammatic illustration in FIG. 3.

In the third stage illustrated in FIG. 3, the panel 17 is still fully retracted inwardly but the motor 34 is stopped by reason of the breakage of the circuit between the leads 42 and 48 caused by the movement of the wiper arm 61 off the contact plate 62 as a result of the opening of the door 11 in excess of 40° of arc to a fully opened position. It will be clear, accordingly, that the panel 11, in accordance with the present invention, does not begin to open until after the door adjacent thereto has opened through an arc of at least 10° and that the panel is fully open when the door adjacent thereto has been opened through an arc of not more than 40°. As the door is opened further to the fully opened position the panel 11 remains open to permit easy egress from and ingress to the automobile through the expended opening provided by the open door and the open panel.

In the normal operation of the invention when the door 11 is open, the panel 17 remains in the open position until the door 11 is closed to within 40° of arc of the fully closed position, at which time wiper arm 61 contacts the edge of the contact plate 62 completing the circuit to the motor and causing the reversible motor 34 to rotate in a clockwise direction and to initiate the closing of the panel 17. When the door 11 has been closed to within 10° of arc of the fully closed position thereof, the panel 17 has reached its fully closed position and the wiper arm 61 has again reached the edge of the contact plate 62, as shown in the first stage of operation illustrated in FIG. 3. Finally, as the door is closed to within less than 10° of arc, the wiper arm 61 passes off the contact plate to break the circuit between the battery 45 and the motor 34, thereby stopping the motor with panel 17 fully closed.

It will be appreciated that in accordance with this invention, the portions of the car roof which must be moved to accomplish the objectives thereof, are but a small part of the total roof area. However, the actual sizes of such panels will vary widely with the make of a car and with the judgment of the individual car manufacturer.

It will be appreciated that it is a significant feature of the invention as aforedescribed, that the displacement of the roof panel does not commence immediately with the start of the door opening, thereby making it possible to open the door slightly in order to close it more firmly, or for other reasons, without moving the panel. Moreover, a full displacement of the panel is not delayed until the full opening of the door, thereby making it possible for a passenger to get in or out of the vehicle relatively easily even though the door is not completely open, as is sometimes necessary.

It will be appreciated that another significant advantage of the invention resides in the fact that there is no part of the car frame or body remaining at the outer edge of the panel area when the door is opened, the seat for the driver or passenger therefore being as accessible as in the case of an open car.

Although this invention has been described with reference to specific forms and embodiments thereof, it will be evident that a great number of variations may be made without departing from the spirit and the scope of this invention. For example, parts may be reversed, equivalent elements may be substituted for those specifically disclosed, and certain features of the invention may be used independently of other features all without departing from the spirit and scope of this invention as defined in the appended claims.

I claim:

1. In a roofed vehicle, a retractable panel disposed in the roof of said vehicle adjacent to a door thereof and automatic means for moving said panel within the plane of the roof of the vehicle in relation to the movement of the adjacent door, said means comprising a reversible motor in electrical connection with a battery of said vehicle, drive means connecting the motor and the panel, and a switch linked mechanically to the adjacent door for operation in relation to the movement of said door, said switch comprising a wiper arm connected to said door and a contact plate, said wiper arm arranged to contact the contact plate when the door is moved outwardly not less than approximately 10 degrees of arc and not more than approximately 40 degrees of arc.

2. In a roofed vehicle, a retractable panel disposed in the roof of said vehicle adjacent to a door thereof and automatic means for moving said panel within the plane of the roof of the vehicle in relation to the movement of the adjacent door, said means comprising a reversible motor in electrical connection with a battery of said vehicle, drive means connecting the motor and the panel, and a switch linked mechanically to the adjacent door for operation in relation to the movement of said door, said switch comprising a wiper arm connected to said door and a contact plate, said wiper arm arranged to contact the contact plate when said door is moved inwardly to within not more than approximately 40 degrees of arc of the closed position thereof and not less than approximately 10 degrees of arc of the closed position thereof.

References Cited in the file of this patent

UNITED STATES PATENTS

| | | |
|---|---|---|
| 2,499,749 | Hilliard | Mar. 7, 1950 |
| 2,857,198 | Himka | Oct. 21, 1958 |
| 3,052,496 | Frey | Sept. 4, 1962 |

FOREIGN PATENTS

| | | |
|---|---|---|
| 556,642 | Italy | Feb. 7, 1957 |